United States Patent Office 3,441,547
Patented Apr. 29, 1969

3,441,547
VINYL ACETATE-METHYL BUTENOL COPOLYMERS
Martin K. Lindemann, Somerville, N.J., assignor, by mesne assignments, to Air Reduction Company, Incorporated, New York, N.Y., a corporation of New York
No Drawing. Filed Dec. 30, 1966, Ser. No. 606,018
Int. Cl. C07f 15/40, 15/10, 15/16
U.S. Cl. 260—85.7                                                 5 Claims

ABSTRACT OF THE DISCLOSURE

This invention relates to new and useful water soluble film materials. More particularly this invention relates to vinyl alcohol-methyl butenol copolymers or interpolymers which form clear, colorless and flexible films. These films are water soluble over a wide temperature range, have adequate tensile and tear strength characteristics to form effective packaging materials, and retain their water solubility and physical strength characteristics even when stored under high temperature and high relative humidity conditions.

---

Water soluble films and wrappers have been widely used for packaging soaps, detergents, bleaches, insecticides and a variety of other materials. Any of these substances wrapped in a package made of these films may be dissolved or dispersed in water by simply depositing the entire package therein. The wrapper rapidly disintegrates with moderate agitation and dissolves completely, thereby releasing the packaged material.

Novel and improved film forming materials have now been found which are rapidly water soluble over a wide temperature range particularly at or below normal room temperature, i.e. 70–75° F. These films also have the necessary physical characteristics to form salable wrappers since they are clear and colorless, flexible, possess good tensile and tear strength and have excellent heat sealing properties.

It is, therefore, an object of this invention to provide new and useful film materials which are particularly characterized by ready solubility in cold water.

It is a further object of this invention to provide new and useful film materials which readily dissolve in cold water and have high tensile strength and heat sealing characteristics making them particularly useful in detergent packaging and related arts.

These and other objects will appear more clearly from the detailed specification which follows.

In accordance with the present invention it has been found that desirable film-forming materials can be prepared by polymerizing vinyl acetate and a methyl butenol under active polymerization conditions in the presence of a polymerization initiating catalyst. The resulting interpolymers of vinyl acetate and methyl butenol are then hydrolyzed or saponified to convert a major portion of the acetate radicals to hydroxyl radicals. The resulting vinyl alcohol-methyl butenol interpolymers are washed and dissolved in water. This aqueous solution is formed into films usually by distributing the solution over glass plates or a smooth metallic surface and drying the same. Films may also be formed by conventional extrusion techniques.

The methyl butenols which may be used as the co-monomer in accordance with the present invention include 1-methyl-3-butene-2-ol, 1-methyl-2-butene-4-ol, 1-methyl-3-butene-2-ol, 2-methyl-3-butene-2-ol and 2-methyl-3-butene-1-ol. The preferred methyl butenol is the 2-methyl-3-butene-2-ol. Mixtures of methyl butenols may also be used, preferably those containing a major proportion of the 2-methyl-3-butene-2-ol.

The polymerization catalysts used to prepared the desired vinyl acetate-methyl butenol copolymers in accordance with the present invention are any free-radical initiating agents such as hydrogen peroxide, benzoyl peroxide, ammonium persulfate, potassium persulfate and aliphatic azo compounds such as α,α'-azodi-iso-butyronitrile and like compounds of the type described in Hunt U.S. Patent 2,471,959. It is preferred to add the polymerization catalyst incrementally to assure a steady rate of polymerization. The polymerization is suitably carried out at the reflux temperature of the charge but may be effected at lower temperature, e.g. 25° C. or above, generally depending upon the actiivty of the catalyst, as is known in the vinyl acetate polymerization art, and preferably for times in the range of ½ to 3 hours. It is preferred that the conversion of monomers to polymers should not exceed about 30–50%. The intrinsic viscosity of the copolymer can be regulated by the addition of methanol to the original monomer charge. It is preferred that the intrinsic viscosity of the copolymer should not be less than 0.35, measured at 30° C. in water.

Upon completion of the copolymerization of the vinyl acetate and the methyl butenol, the reaction product is stripped of the unreacted monomers and subjected to hydrolysis or saponification to convert at least some of the vinyl acetate units to vinyl alcohol units. Alcoholating agents such as methoxide or methylate salts of sodium or potassium, or sodium or potassium hydroxide may be used in alcoholizing the copolymer to a polymer principally composed of polyvinyl alcohol and poly-methyl butenol. The final polymer product, however, may contain some vinyl acetate units, the amount thereof being dependent upon the degree of hydrolysis. It is preferred to hydrolyze the copolymer to such a degree that at least 80% of the acetate group therein are converted to hydroxyl groups. The alcoholating agent is preferably reacted with the copolymer in the form of a methanol solution.

In preparing the vinyl acetate-methyl butenol copolymers of the present invention, from about 85 to 98.5 weight percent vinyl acetate and from about 2.5 to 15 weight percent of methyl butenol may be employed. For the preparation of cold water soluble films having the desired low temperature flexibility, tensile strength and tear resistance it is preferred to use from about 2.5 to about 7.5 weight percent methyl butenol in the monomer charge. The preferred final copolymers, i.e. the products after hydrolysis contain from about 2 to 15 mole percent methyl butenol and may contain up to about 20 mole percent polyvinyl acetate with the remainder being polyvinyl alcohol, but preferably the vinyl acetate content is at most about 5 mole percent.

The vinyl alcohol-methyl butenol copolymers produced in accordance with the present invention can be formed into films by a variety of procedures such as extrusion or by casting aqueous solutions thereof on glass or stainless steel plates and allowing the cast films to dry. In general, the film casting solutions contain about 10–12 percent of the copolymer and are made into films which, when dried, have a thickness of from 2 to 2.5 mils. Drying the cast film on glass at room temperature does not always yield films having the same properties as films obtained by casting the film on polished stainless steel plates and drying in a forced air oven at 180° F., a procedure more closely resembling commercial film casting practice. Ordinarily the dried film is "conditioned" by exposing it at either 50% or 80% relative humidity, at 72° F. for about 48 hours, prior to testing for solubility and mechanical properties.

Cold water solubility of the films is readily determined by immersing a conditioned 2" x 2" sample of dried film two mils thick in 2000 cc. of distilled water maintained at 72±1° F. which is mildly agitated by a magnetic stirrer operating at about 200 r.p.m. The time (in seconds) of initial film breakdown (disintegration) and of complete dissolution are recorded. Films which dissolve completely in less than three minutes are regarded as having acceptable or excellent solubility.

While films made of the vinyl alcohol-methyl butenol copolymers have good solubility and mechanical properties, these films may be further improved, particularly as to their low temperature flexibility characteristics, by the addition of suitable plasticizers thereto prior to the formation of the film. Various well known polymer plasticizers may be employed such as glycerol (GLY), diethylene glycol (DEG), triethylene glycol (TEG), triethanolamine (TEA), triethanolamine acetate (TEA-Ac), 1,3-butanediol (1,3BD), Carbowax-200 (C-200) and Vircol-189 (V-189) a mixture of hydroxylated butyl phosphoric acids.

Low temperature flexibility of polyvinyl alcohol-methyl butenol copolymer films of the present invention was determined as follows. Film which was conditioned (72° F. 50% R.H.) was used to make pouches (2½" x 5") which were then filled with two ounces of detergent granules, sealed, and put into desiccators containing a mixture of solid calcium chloride-hexahydrate and saturated calcium chloride solution. These desiccators were then kept at 50° C. for 48 hours and one week, respectively. The relative humidity inside the desiccators was 15–20%. After the conditioning period the bags were taken out of the desiccators and cut open to remove the detergent, whereupon strips of the film material were cooled rapidly to −10° C., −20° C. and −40° C. in an acetone-Dry Ice bath. After 2 minutes the film strips were taken out and flexed rapidly. Shattering or breaking of the film was taken as failure.

The following examples are illustrative of the present invention.

Example I

Polymerization was carried out in a one gallon resin kettle equipped with a stirrer, reflux condenser, gas inlet tube and dropping funnel. The kettle was flushed with nitrogen and the monomer mixture of 2700 grams of vinyl acetate (VAc) and 300 grams of 2-methyl-3-butene-2-ol (MBe) was charged and heated to a light reflux after which 50 g. of a 5% solution of α,α'- azodiiso-butyronitrile was added to the mixture. Polymerization was continued for about 2.5 hours at which point 42% conversion was achieved, after which about 10 grams of styrene was added to stop the reaction. The excess monomer was stripped from the VAc-MBe copolymer and replaced by methanol. The final concentration of copolymer in methanol was 20% by weight.

This solution was added dropwise and with agitation to a mixture of 6000 g. methanol and 75 g. of a saturated aqueous sodium hydroxide solution. Saponification was completed after 0.5 hour whereupon the polymer was collected on a Büchner funnel, washed with methanol and dried in vacuo at 50° C. The copolymer contained about 88 mole percent vinyl alcohol, 11.5 mole percent methyl butenol and the remainder vinyl acetate. The product had an intrinsic viscosity in water of 0.40.

A film formed from this product had excellent cold (75° F.) water solubility characteristics, disintegrating in 15 seconds. Mechanical properties after conditioning at 80% R.H. for 48 hours were: tensile strength 2780 p.s.i., elongation 250%, 100% modulus 2150 p.s.i. A film was also prepared from this product after mixing 75 parts thereof with 25 parts of a commercial plasticizer Vircol 189 (a mixture of hydroxyethylated butyl phosphoric acids). This plasticizer reduced the clarity of the resultant film slightly but did not reduce its excellent cold-water solubility characteristics. Mechanical properties after conditioning at 80% R.H. for 48 hours were: tensile strength 2000 p.s.i., elongation 380% and 100% modulus 825 p.s.i.

Example II

The same procedure as Example I was followed except that 2850 grams of vinyl acetate and 150 grams of 2-methyl-3-butene-2-ol were employed and polymerization was continued for only ½ hour at which point 11% conversion was achieved. The copolymer contained about 88 mole percent vinyl alcohol, 10.5 mole percent methyl butenol and the remainder vinyl acetate. The product had an intrinsic viscosity in water of 0.58.

A film formed from this product had excellent cold (75° F.) water solubility characteristics disintegrating in 50 seconds and dissolving completely in 120 seconds. Mechanical properties after conditioning at 80% R.H. for 48 hours were: tensile strength 3445 p.s.i., elongation 505%, 100% modulus 1155 p.s.i.

Example III

The same procedure as Example I was followed except that 2925 grams of vinyl acetate and 75 grams of 2-methyl-3-butene-2-ol were employed and polymerization was continued for ½ hour at which point 12% conversion was achieved. The copolymer contained about 89 mole percent vinyl alcohol, 10 mole percent methyl butenol and the remainder vinyl acetate. The product had an intrinsic viscosity in water of 1.15.

When tested for cold (75° F.) water solubility characteristics, a film formed from this product disintegrated in 60 seconds and dissolved completely in 300 seconds. Mechanical properties after conditioning at 80% R.H. for 48 hours were: tensile strength 4165 p.s.i., elongation 355% and 100% modulus 2050 p.s.i.

Example IV

The same procedure as Example I was followed except that a twenty-gallon reactor was used and the amounts of monomer mixture and catalyst were increased proportionally in two runs designated hereinafter as Runs A and B. In both runs the monomer feed consisted of 92.5% by weight vinyl acetate and 7.5% 2-methyl-3-butene-2-ol.

In Run A, the polymerization reaction time was 1.5 hours, the conversion was 26% and the resultant copolymer contained about 92 mole percent vinyl alcohol, 5.5 mole percent methyl butenol and the remainder vinyl acetate. The product of Run A had an intrinsic viscosity in water of 0.40.

A film former from this product had excellent cold water solubility characteristics, disintegrating in 25 seconds and dissolving completely in 90 seconds. Mechanical properties after conditioning at 80% R.H. for 48 hours were: tensile strength 3320 p.s.i., elongation 545% and 100% modulus 1015 p.s.i.

A sample of film was prepared from this product in which 7.5% TEA and 7.5% DEG were incorporated. One sample thereof cast on glass plates and air dried had a tensile strength of 2330 p.s.i. and 100% modulus of 785 p.s.i., while another sample thereof machine cast had a tensile strength of 3155 p.s.i. and 100% modulus of 1365 p.s.i.

Test samples of the plasticized films disintegrated when agitated in distilled water at 75° F. in 14 seconds and dissolved completely in 80 seconds. Another sample which had been heat sealed disintegrated in the heat seal area in 25 seconds and dissolved completely in 245 seconds.

In Run B, the polymerization reaction time was 2 hours, the conversion was 10% and the resultant copolymer contained about 94 mole percent vinyl alcohol, 4.5 mole percent methyl butenol and the remainder vinyl acetate. The product of Run B had an intrinsic viscosity in water of 0.48. A film formed from this product had excellent cold water solubility characteristics, disintegrating in 30 seconds and dissolving completely in 120 seconds. Mechanical properties after conditioning at 80% R.H. for 48 hours were: tensile strength 3035 p.s.i., elongation 350% and 100% modulus 1335 p.s.i.

A number of films were prepared, adding various plasticizers, either singly or in combination, to the product of Example III, the test results of which are summarized in the following table.

TABLE

| Type | Plasticizers, percent | Film clarity | C.W.S. rating | Low temp. Flexibility at −10° C. | Mechanical 50% rel. hum. | | | Properties 80% rel. hum. | | |
|---|---|---|---|---|---|---|---|---|---|---|
| | | | | | Tensile strength, p.s.i. | Elongation, percent | 100% Modulus, p.s.i. | Tensile strength, p.s.i. | Elongation, percent | 100% Modulus, p.s.i. |
| TEG / GLY | 7 / 18 | Clear | Excellent | Good | 3,755 | 370 | 1,595 | 2,110 | 620 | 605 |
| TEG / TEA-Ac | 10 / 15 | ...do | do | do | 3,710 | 350 | 1,550 | 1,820 | 505 | 665 |
| GLY | 15 | ...do | do | Low | 4,730 | 265 | 2,780 | 2,578 | 775 | 625 |
| 1,3BD / GLY | 10 / 20 | ...do | do | Good [1] | | | | 1,755 | 705 | 595 |
| C-200 / TEA-Ac | 5 / 25 | ...do | do | do | 3,505 | 335 | 1,805 | 1,725 | 630 | 520 |
| GLY | 20 | ...do | do | do | 3,780 | 420 | 1,430 | 1,465 | 615 | 445 |
| GLY / 1,3BD | 20 / 5 | ...do | do | do | 3,860 | 505 | 1,290 | 1,445 | 530 | 485 |
| GLY / TEG | 20 / 5 | ...do | do | do | | | | 1,705 | 670 | 505 |

[1] Also at −20° C. and −40° C.

TEG=triethyleneglycol, GLY=glycerine, TEA-Ac=triethyleneamine acetate, 1,3BD=1,3-butanediol, and C-200=Carbowax-200.

The above data shows that the vinyl alchol-methyl butenol copolymers of the present invention are readily dissolved in cold water, have good tensile strength and by the addition of suitable plasticizers acquire good low temperature flexibility without loss of solubility or strength. It will be understood, however, that this invention is not limited to these examples since numerous variations will be apparent to those skilled in this art without departing from the scope of the appended claims.

I claim:

1. A cold-water soluble, addition copolymer of vinyl alcohol and a methyl butenol containing 0 to 20 mole percent of vinyl acetate, said methyl butenol being present in the copolymer in the amount of from 2 to 15 mole percent.

2. A copolymer as defined in claim 1, in which the methyl butenol is 2-methyl-3-butene-2-ol.

3. A copolymer as defined in claim 1, in the form of a cold-water soluble film.

4. A copolymer in the form of a film as defined in claim 3, containing a plasticizer to improve the low temperature flexibility thereof.

5. A copolymer in the form of a film as defined in claim 3, containing a plasticizer to improve the low temperaure flexibility thereof and in which the methyl butenol is 2-methyl-3-butene-2-ol.

References Cited

UNITED STATES PATENTS 2,740,771  4/1956  Longley et al. _____ 260—85.7

JOSEPH L. SCHOFER, Primary Examiner.

S. M. LEVIN, Assistant Examiner.

U.S. Cl. X.R.

260—91.3